United States Patent [19]
Ivansons et al.

[11] Patent Number: 5,632,852
[45] Date of Patent: May 27, 1997

[54] ION GENERATOR IN CONNECT/ DISCONNECT OF PLASTIC TUBES

[75] Inventors: Ivars V. Ivansons, Claymont; Valdis Ivansons, Wilmington, both of Del.

[73] Assignee: Denco, Inc., Wilmington, Del.

[21] Appl. No.: 398,988

[22] Filed: Mar. 6, 1995

Related U.S. Application Data

[63] Continuation-in-part of Ser. No. 158,505, Nov. 29, 1993, Pat. No. 5,397,425, which is a continuation-in-part of Ser. No. 965,875, Oct. 23, 1992, Pat. No. 5,279,685.

[51] Int. Cl.$^6$ ........................................... B32B 31/00
[52] U.S. Cl. .................. 156/503; 156/304.2; 156/535
[58] Field of Search ........................ 156/304.2, 304.5, 156/304.6, 502, 503, 508, 535

[56] References Cited

U.S. PATENT DOCUMENTS

| | | | |
|---|---|---|---|
| 3,729,360 | 4/1973 | McElroy | 156/535 X |
| 3,793,119 | 2/1974 | Province | 156/535 X |
| 4,672,504 | 6/1987 | Stone | 361/231 |
| 4,673,416 | 6/1987 | Sakakibara et al. | 55/137 |
| 4,811,159 | 3/1989 | Foster, Jr. | 361/231 |
| 4,883,224 | 11/1989 | Sun | 232/43.1 |
| 5,122,352 | 6/1992 | Johnson | 423/242 |

FOREIGN PATENT DOCUMENTS

A0599057  1/1994  European Pat. Off. .

OTHER PUBLICATIONS

Patent Abstracts of Japan, vol. 012, No. 286 (M–727), 5 Aug. 1988 JP–A–63 061826 (Sanyo Electric Co. Ltd), 18 Mar. 1988.

*Primary Examiner*—David A. Simmons
*Assistant Examiner*—Paul M. Rivard
*Attorney, Agent, or Firm*—Connolly & Hutz

[57] ABSTRACT

When plastic tubes are melted in a connect or disconnect procedure aerosol particles are formed. The aerosol particles are confined or contained by providing an ion generator which imparts an electrical charge to the particles. The charged particles are then collected by a collector plate within the device.

11 Claims, 2 Drawing Sheets

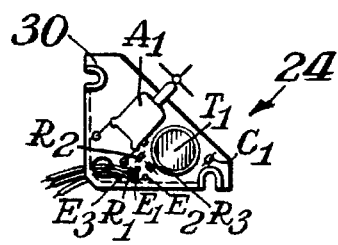
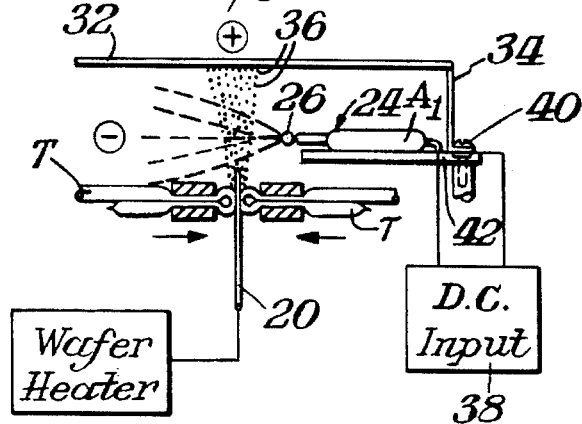
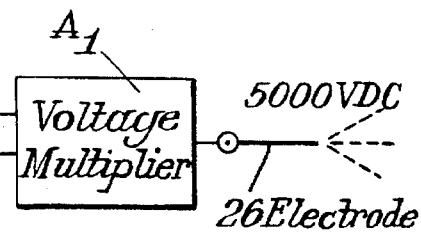

ION GENERATOR IN CONNECT/ DISCONNECT OF PLASTIC TUBES

CROSS-REFERENCE TO RELATED APPLICATION

This application is a continuation-in-part of application Ser. No. 08/158,505 filed Nov. 29, 1993, now U.S. Pat. No. 5,397,425, which in turn is a continuation-in-part of application Ser. No. 07/965,875 filed Oct. 23, 1992, now U.S. Pat. No. 5,279,685.

BACKGROUND OF THE INVENTION

The present application is directed to the sterile welding (connect) or disconnect procedures utilized in welding/disconnect of plastic tubes. Various patents of the assignee relate to devices which could be used for welding or disconnecting various plastic tubes for various purposes. These patents include U.S. Pat. Nos. 4,753,697, 4,770,735, 4,793,880, 4,832,773, 4,864,101, 4,897,138, 4,913,756, 4,933,036, 5,141,592, 5,156,701, 5,158,630, 5,209,800, 5,244,552, 5,248,359, 5,256,229 and 5,279,685.

In the use of such devices and other devices wherein plastic tubes are heated in order to accomplish the welding of two tube sections, or the cutting through or melting of a single tube, aerosol particles are created. For example, where the plastic tubes are made from polyvinylchloride (PVC), the PVC material emits plastic aerosol particles in the air. The creation of such particles results in cloudiness in the general area of the device with its attendant disadvantages.

SUMMARY OF THE INVENTION

An object of this invention is to provide a device for the welding and/or disconnecting of plastic tubes which incorporates a heated member and wherein there is containment of the aerosol particles created in use of the device.

A further object of this invention is to provide such a device which can be readily adapted to existing techniques.

In accordance with this invention, a device for the connect/disconnect of plastic tubes includes a heated wafer which causes melting of the tubes and thus creates the aerosol problem. This problem, however, is solved by containing the aerosol particles. Specifically, an ion generator is provided in the device to provide a charge, such as a negative charge on the aerosol particles. The charged particles then have a natural tendency to seek a neutral metal plane which is used as an aerosol collection plate.

In the preferred practice of this invention the aerosol collection plate is mounted in the top cover of the device so as to confine the aerosol particles within the device and thus prevent the particles from escaping into the atmosphere outside the device.

The ion generator is preferably a negative ion generator which uses high potential and low current source and which uses an output electrode. The high potential produces negative charges in the vicinity of the output electrode to in turn charge the aerosol particles electrically. The charged particles are then collected on a plate mounted in the top cover of the device.

A BRIEF DESCRIPTION OF THE DRAWINGS

FIG. 4 is a top plan view of an ion generator used in the device of FIGS. 1–3;

FIG. 5 is a schematic end elevational view showing the ion generator of FIG. 4 in use; and FIG. 6 is an electrical wiring diagram showing connection of the components used for the ion generator of this invention.

DETAILED DESCRIPTION

The present invention is directed to techniques used in the connecting and/or disconnecting of plastic tubes which incorporate a heated element for melting the tubes. Such devices are of the general type shown and described in parent application Ser. No. 08/158,504 filed Nov. 29, 1993, now U.S. Pat. No. 5,397,425, and its parent U.S. Pat. No. 5,279,685, the details of these parent application and patent are incorporated herein by reference thereto. The following description will be directed primarily to the parts necessary for an understanding of the present invention. It is to be understood, however, that the concepts of this invention may be utilized with other devices wherein plastic tubes are heated thereby creating aerosol particles and wherein it is desired to provide some confinement or containment of the particles.

Figure 1:
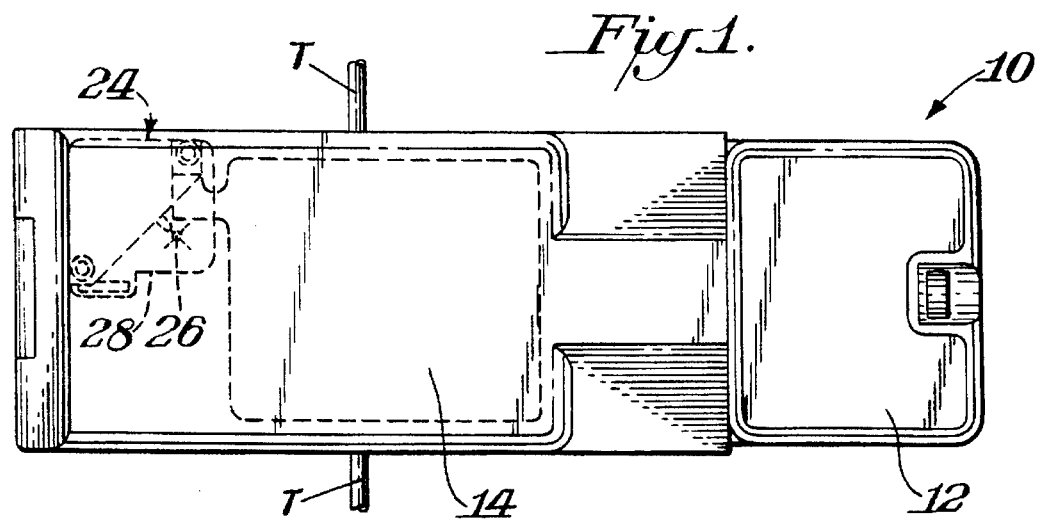
FIG. 1 is a top plan view of a connect/disconnect device in accordance with this invention.
Figure 2:
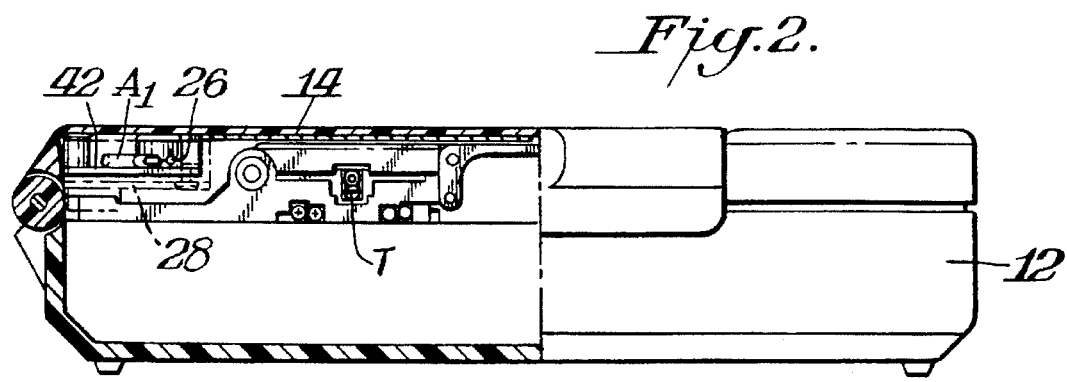
FIG. 2 is a side elevational view partly in section of the device shown in FIG. 1.
Figure 3:
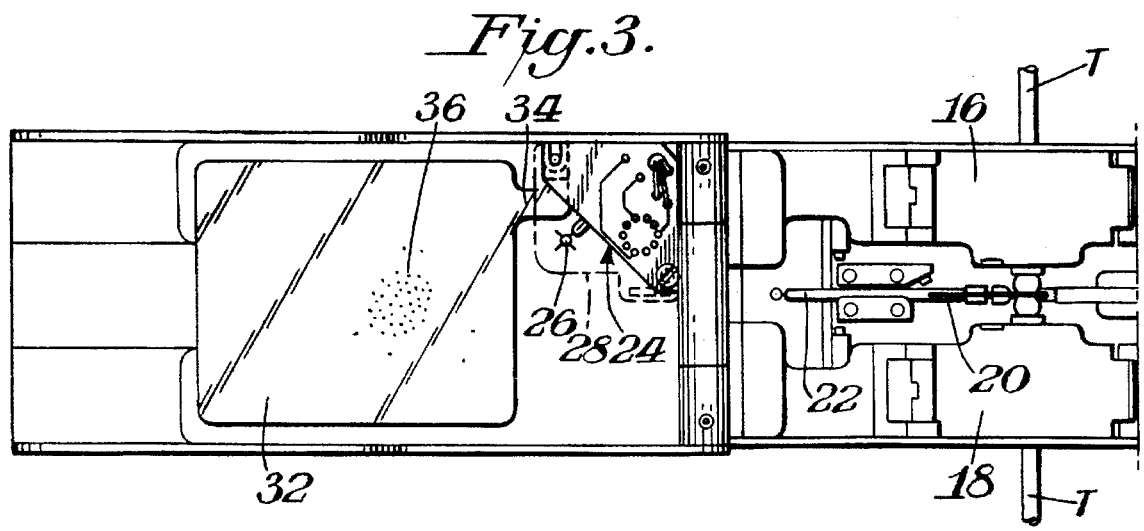
FIG. 3 is a partial top plan view of the device shown in FIGS. 1–2.

As shown in FIGS. 1–3, a total containment welding/disconnect device 10 is illustrated. Device 10 includes a base 12 having a pivoted cover 14. FIG. 3 illustrates the cover 14 in its open condition so that the inside surface of the cover is visible. Mounted to base 12 is a pair of tube holders. As shown in FIG. 3 a plastic tube T is inserted in each holder in alignment with each other. Each tube is then clamped in place by the pivoted clamp members 16,18. The tubes T,T are spaced from each other a distance sufficient to permit a heated wafer 20 to pass through the space, as shown in FIGS. 3 and 5. Where the device is of the type described in parent U.S. Pat. No. 5,279,685 the ends of the tubes T,T are heated and melted in a melt/wipe process during the passage of wafer 20. Wafer 20 continues downstream to the wafer removal station 22. The tubes are then pressed against each other so that their melted ends contact each other thereby welding the tube sections together to form an integral tube in the manner described in parent U.S. Pat. No. 5,279,685. It is to be understood that the invention may also be practiced where instead of utilizing a melt/wipe process for welding the tube sections together a heated wafer may be used which physically cuts through the tube sections causing the tube sections to become molten.

Where the device is used for disconnect purposes, the tube sections T,T shown in FIG. 3 would be a single tube extending across both holders and clamped in position by clamp members 16,18. Heated wafer 20 then passes through the tube to separate the tube into individual sections.

In either the welding (connect) or disconnect procedures, aerosol particles would result where the temperature is sufficiently high. For example, at temperatures above 260° C. PVC material emits plasticizer aerosol particles in the air. It is the creation of these particles that result in the problems which the present invention solves.

In accordance with this invention device 10 is provided with a negative ion generator 24 which is best shown in FIGS. 3–5. As shown therein the negative ion generator includes an electrode 26 mounted in ion generator housing 28, shown in phantom in FIG. 3. FIG. 4 illustrates the ion generator 24 in its top plan view. As shown therein the generator includes a plate 30, voltage multiplier $A_1$, transformer $T_1$, resistors $R_1$, $R_2$, $R_3$, capacitor $C_1$ with the various wiring $E_1$, $E_2$, $E_3$. FIG. 6 is a electrical wiring diagram showing the connection of the various components.

Ion generator 24 is mounted to the inside of cover 14. A ground plate 32 is also mounted to the inside of cover 14. Ground plate 32 includes a lead 34 connected to a PC board 42, as shown in FIG. 5.

FIG. 5 best illustrates the practice of the invention in containing or confining the aerosol particles. As shown therein, particles 36 are generated upon heating the plastic tubes T,T. Although FIG. 5 illustrates a practice of the invention wherein each tube T,T is bent upon itself, the bending of the tubes does not form a part of this invention. The creation of aerosol particles 36 results when wafer 20 passes through the space between the tubes T,T. As previously indicated after the tube ends are melted the molten ends are welded together by pressing the tubes into contact with each other as indicated by the directional arrows in FIG. 5.

Ion generator 24 uses a high potential, approximately 5,000 volts DC, low current (approximately 1 micro amp) source 38 and an output electrode 26. The high potential produces negative charges in the vicinity of output electrode 26. The electrode 26 is a needle where the charge density at the tip is so high that negative charges escape into the air. Molecules of ionized air rush from the needle and charge aerosol particles 36 electrically. The charged particles 36 have a natural tendency to seek a neutral metal plane. In the device 10 the plane is the aerosol collection plate 32 mounted in top cover 14. FIG. 3 illustrates the collection of particles 36 on ground collection plate 32. Such particles 36 can easily be removed by wiping, for example, with a cotton swab.

As also illustrated in FIG. 5, plate 32 may function as if positively charged. The plate 32 is connected to the PC board 42 with the screw 40 making electrical contact with the PC board 42.

The preferred practice of this invention the ground plate 32 is used for attracting the negatively charged aerosol particles 36. This is preferred since the ground plate 32 is readily accessible by being mounted to the inside of top cover 14, thus facilitating the cleaning or removal of the particles.

The invention may also be broadly practiced by attracting the particles to other structure. Parent U.S. Pat. No. 5,279,685, for example, discloses the use of a negative ion generator to dissipate the aerosol that results from the melted plastic tubes wherein the dissolved gases are attracted to the copper wafer. Since the wafer is mounted within the device, the closed cover assures maintaining any smoke in the closed cavity so that the aerosol would be directed to the wafer.

An advantageous feature of the invention is the mounting of the aerosol containment components within a closed chamber formed by cover 14 being mounted in its closed condition on base 12. This minimizes the possibility of smoke or aerosol particles 36 escaping into the air around device 10.

A further advantage of the invention is in the ability to collect the aerosol particles by wiping the particles from ground plate 32. By having the particles collected it is possible to make a rapid analysis of the tubing material from what is contained in the particles. This can be done, for example, by using a mass spectrometer.

What is claimed is:

1. A device for the selective connecting and disconnecting of plastic tubes, said device including a housing having a base and a cover selectively movably mounted over said base between open and closed positions, a pair of tube holders mounted to said base, each of said tube holders having a tube receiving area, the closing of said cover causing the clamping and fattening of plastic tubes in said tube receiving areas, said tube holders being disposed toward and spaced away from each other with said tube receiving area of each of said holders in alignment with each other, a heated wafer movably mounted in the space between said holders, an ion generator mounted in said device for electrically charging the aerosol particles created by the heating of the plastic tubes, and a collector being in said device for collecting the electrically charged particles.

2. The device in claim 1 wherein said device includes a closed chamber, and said collector being in said closed chamber to confine the collected particles within said device.

3. The device of claim 2 wherein said device includes a housing having a base, and a cover selectively covering said base to create said closed chamber between said cover and said base.

4. The device of claim 3 wherein said ion generator is mounted to the inner surface of said cover.

5. The device of claim 4 wherein said ion generator includes an output electrode for generating negative ions.

6. The device of claim 5 wherein said ion generator uses high potential and low current source.

7. The device of claim 4 wherein said collector is a ground plate.

8. The device of claim 7 wherein said ground plate is mounted on said inside surface of said cover.

9. The device of claim 3 wherein said collector is a ground plate.

10. The device of claim 9 wherein said ground plate is mounted on said inside surface of said cover.

11. The device of claim 1 wherein said collector is a ground plate.

* * * * *